United States Patent
Park et al.

(10) Patent No.: US 10,940,422 B2
(45) Date of Patent: Mar. 9, 2021

(54) AIR PURIFIER

(71) Applicant: Samsung Electronics Co., Ltd., Suwon-si (KR)

(72) Inventors: Dah-we Park, Seoul (KR); Gi-hoon Ko, Seoul (KR); Yeon-young Nam, Goyang-si (KR); Ji-hyeoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 16/028,309

(22) Filed: Jul. 5, 2018

(65) Prior Publication Data

US 2019/0060817 A1 Feb. 28, 2019

(30) Foreign Application Priority Data

Aug. 28, 2017 (KR) ........................ 10-2017-0108599

(51) Int. Cl.
*B01D 46/26* (2006.01)
*B01D 46/00* (2006.01)
*B01D 46/24* (2006.01)

(52) U.S. Cl.
CPC ......... *B01D 46/26* (2013.01); *B01D 46/0043* (2013.01); *B01D 46/0056* (2013.01);
(Continued)

(58) Field of Classification Search
CPC ........................... B01D 46/26; B01D 46/0002; B01D 46/0005; B01D 46/0065; B01D 46/0064;
(Continued)

(56) References Cited

U.S. PATENT DOCUMENTS 5,238,473 A * 8/1993 Femiani ............. B01D 46/0056
55/290
5,565,012 A * 10/1996 Buodd ............... B01D 46/0068
15/352
(Continued)

FOREIGN PATENT DOCUMENTS

JP 4124225 B2 7/2008
JP 4910527 B2 4/2012
(Continued)

OTHER PUBLICATIONS

Hitachi; "Every Home Deserves Hitachi Cooling"; Johnson-Controls—Hitachi Air Conditioning India Limited; Jun. 27, 2018; 42 pages.

*Primary Examiner* — Minh Chau T Pham (57) ABSTRACT

An air purifier is provided. The air purifier according to an exemplary embodiment includes a body including an air inlet and an air outlet, an air blowing unit disposed in an inside of the body, the air blowing unit being configured to forcibly introduce outside air into the inside of the body through the air inlet and discharge air into the air outlet, a filter unit rotatably disposed between the air blowing unit and the air inlet, a driving motor configured to rotate the filter unit, and a cleaning member detachably connected to a vacuum cleaner and disposed in proximity to the filter unit to guide contaminants adhering to the filter unit to be flown into the vacuum cleaner.

12 Claims, 8 Drawing Sheets (52) U.S. Cl.
CPC ..... *B01D 46/0065* (2013.01); *B01D 46/0079* (2013.01); *B01D 46/2403* (2013.01); *B01D 2273/28* (2013.01); *B01D 2273/30* (2013.01)

(58) Field of Classification Search
CPC .............. B01D 46/2403; B01D 46/008; B01D 46/0043; B01D 46/2411; B01D 46/4227; B01D 46/0079; B01D 46/0056; B01D 2273/28; B01D 2273/30
USPC ............... 55/385.1, 467, 471–473, 283–294; 95/278, 279
See application file for complete search history.

(56) References Cited

U.S. PATENT DOCUMENTS

| | | | | |
|---|---|---|---|---|
| 5,584,900 | A * | 12/1996 | Zaiser | B01D 41/04 55/293 |
| 7,494,520 | B2 * | 2/2009 | Nam | A47L 9/1666 15/347 |
| 2006/0042202 | A1 * | 3/2006 | Lee | A47L 9/20 55/289 |
| 2008/0223062 | A1 | 9/2008 | Yabu et al. | |
| 2009/0205498 | A1 * | 8/2009 | Wang | B01D 46/0065 95/279 |
| 2010/0199697 | A1 | 8/2010 | Sakashita | |
| 2012/0180665 | A1 * | 7/2012 | Jeong | F24F 1/0047 95/282 |
| 2018/0328605 | A1 * | 11/2018 | Bae | B01D 46/42 |

FOREIGN PATENT DOCUMENTS

| | | |
|---|---|---|
| JP | 5262634 B2 | 8/2013 |
| JP | 5755088 B2 | 7/2015 |
| KR | 101647641 B1 | 8/2016 |
| KR | 1020180020663 A | 2/2018 |

* cited by examiner

AIR PURIFIER

CROSS-REFERENCE TO RELATED APPLICATION AND CLAIM OF PRIORITY

This application claims priority from Korean Patent Application No. 10-2017-0108599, filed on Aug. 28, 2017, in the Korean Intellectual Property Office, the disclosure of which is incorporated herein by reference in its entirety.

BACKGROUND

1. Field of the Invention

Devices and methods consistent with what is disclosed herein relate to an air purifier.

2. Description of the Related Art

An air purifier is a device used to remove contaminants in the air, and can remove dust, fine dust, bacteria, viruses, fungi, and chemicals that cause odors present in the air.

In general, an air purifier has a filter for purifying contaminants present in the air. The outside air inhaled into the air purifier passes through a filter to filter the contaminants, and the purified air is externally discharged again.

The filter provided in the air purifier includes a plurality of filters to effectively remove various contaminants in the air, and the plurality of filters are combined to constitute a filter unit.

For example, the filter provided in the air purifier includes a pre-filter that filters dust having relatively large particles or pollen, a dust filter that filters fine dust and the like, an antibacterial filter for sterilization, a deodorization filter for deodorization, and the like. In addition, the air purifier includes a filter unit in which the pre-filter, the dust filter, the antibacterial filter, and the deodorization filter are sequentially stacked.

Typically, a pre-filter is disposed at the outermost side (or most forward portion) of the filter unit from which outside air starts to pass, so that dust, pollen, etc. in the air can be primarily filtered.

However, in the case of the conventional air purifier, contaminants such as dust accumulate on the surface of a filter, that is, the surface of a pre-filter disposed at the outermost side (or most forward portion) of a filter unit. As a result, a purifying performance could be deteriorated due to the accumulated contaminants.

Therefore, for the conventional air purifier, it is required to periodically remove the contaminants accumulated on the surface of a filter or replace a filter of the air purifier.

SUMMARY

An aspect of the exemplary embodiments relates to providing an air purifier with improved management convenience by easily removing contaminants accumulated on a filter.

According to an exemplary embodiment, there is provided an air purifier including a body including an air inlet and an air outlet, an air blowing unit disposed in an inside of the body, the air blowing unit being configured to forcibly introduce outside air into the inside of the body through the air inlet and discharge air into the air outlet, a filter unit rotatably disposed between the air blowing unit and the air inlet, a driving motor configured to rotate the filter unit, and a cleaning member detachably connected to a vacuum cleaner and disposed in proximity to the filter unit to guide contaminants adhering to the filter unit to be flown into the vacuum cleaner.

The cleaning member may include a body including a suction flow path where an extension pipe of the vacuum cleaner is inserted into one side, and a suction port connected to the other side of the suction flow path and including an air inlet port opened along a longitudinal direction of the filter unit.

A diameter of the air inlet port may increase from one end adjacent to the suction flow path to the other end adjacent to the filter unit.

The air purifier may further include a filter tray on which the filter unit is disposed, wherein the filter unit includes a cylindrical filter rotatable based on a rotation axis, and a ring-shaped cover engaged with an upper surface of the filter, and wherein the suction port is disposed in parallel with the rotation axis to face an outer circumferential surface of the filter.

The ring-shaped cover and the filter tray each may have a larger diameter than the outer circumferential surface of the filter to protrude from the outer circumferential surface of the filter in a direction perpendicular to the rotation axis, and wherein the suction port is disposed between the ring-shaped cover and the filter tray and faces the outer peripheral surface of the filter.

The air inlet port may include a main air inlet port opened toward the outer circumferential surface of the filter, and first and second auxiliary air inlet ports respectively disposed on both ends of the main air inlet port and opened toward a protrusion unit of the ring-shaped cover and a protrusion unit of the filter tray.

The cleaning member may include a rake part disposed along a periphery of the main air inlet port and configured to rake contaminants adhering to the outer circumferential surface of the filter.

The rake part may be formed by a plurality of protrusions or a plurality of brushes protruding toward the outer circumferential surface of the filter.

The main air inlet port may include first and second edges disposed in parallel along a longitudinal direction of the outer circumferential surface of the filter, wherein the first edge, the main air inlet port and the second edge are sequentially disposed along a rotational direction of the filter, and wherein the plurality of protrusions and the plurality of brushes are disposed on the second edge.

The body may further include a docking unit connected to one side of the suction flow path and into which the extension pipe is inserted, wherein the cleaning member further includes a packing member surrounding an inner circumferential surface of the docking unit.

The air purifier may further include a cover configured to open and close the docking unit.

The air inlet may be formed in a grill shape that surrounds the outer circumferential surface of the filter.

The filter tray may include an engagement member disposed on a bottom surface of the filter tray to be eccentric from the rotation axis, and wherein the driving motor includes a motor body including a motor shaft, and a pressing member rotating in engagement with the motor shaft, extending in a direction perpendicular to the motor shaft and pressing the engagement member to allow the filter tray to rotate.

The body may further include a main case, and a filter basket detachably engaged with the main case, wherein the filter unit and the cleaning member are disposed in the filter basket.

The filter basket may include a grill surrounding an outer circumferential surface of the filter unit.

DETAILED DESCRIPTION OF EXEMPLARY EMBODIMENTS

Hereinafter, embodiments of the present disclosure will be described in detail with reference to the accompanying drawings. The embodiments described below will be described on the basis of embodiments most suitable to understand the technical features of the present disclosure and the technical features of the present disclosure are not limited by the described embodiments, and the present disclosure may be implemented with embodiments.

Therefore, it is intended that the present disclosure covers the modifications and variations of this invention provided within the scope of the appended claims and their equivalents. In order to facilitate understanding of the embodiments to be described below, in the reference numerals shown in the accompanying drawings, among the components having the same function in each embodiment, the related components are denoted by the same or an extension line number. In addition, the attached drawings are not drawn to scale, but the dimensions of some of the components may be exaggerated to facilitate understanding of the invention.

Figure 1:
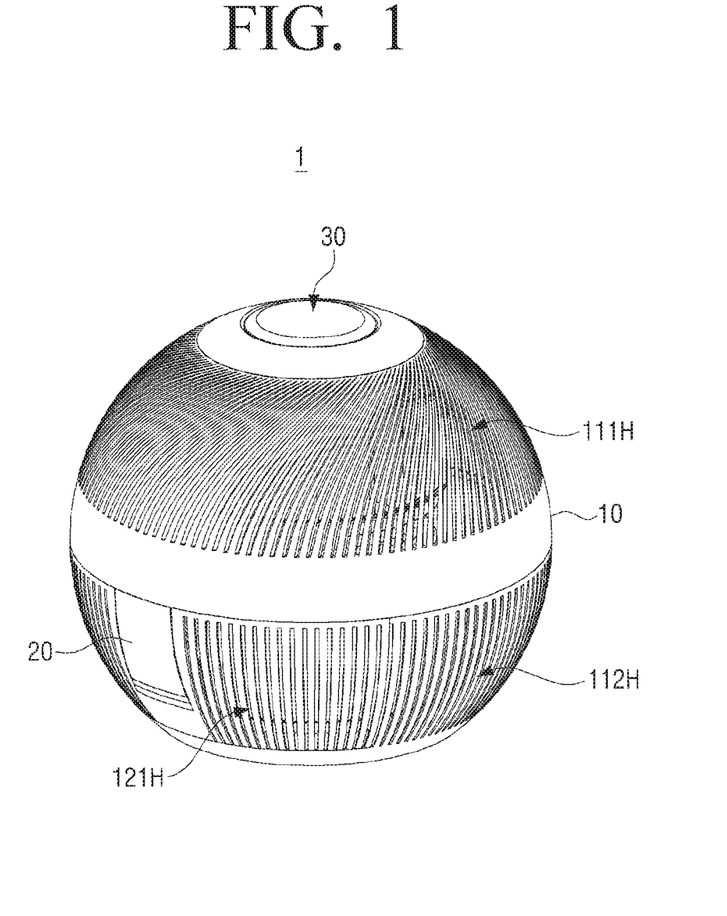
FIG. 1 is a perspective view illustrating an air purifier according to an embodiment of the present disclosure.
Figure 2:
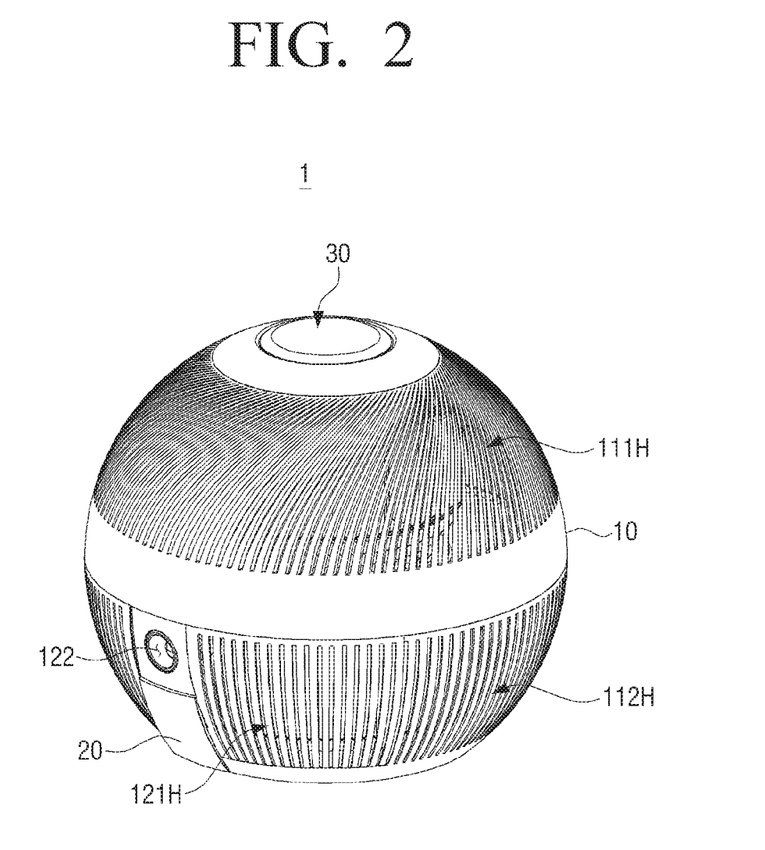
FIG. 2 is a perspective view illustrating a state where a cover of the air purifier shown in FIG. 1 is opened.

FIG. 1 is a perspective view illustrating an air purifier 1 according to an embodiment of the present disclosure, and FIG. 2 is a perspective view illustrating a state where a cover 20 of the air purifier 1 shown in FIG. 1 is opened.

The air purifier 1 according to an embodiment of the present disclosure described below may inhale outside air to filter contaminants such as dust, fine dust, germs, viruses, fungi, chemicals that cause odors through a filter, and discharge the purified air into the outside. The same structure may be applied to an air conditioner having an air purifying function or a humidifier.

The air purifier 1 may form an external appearance of the air cleaner 1 and include a body 10 having air inlets 112H and 121H and an air outlet 111H.

The air inlets 112H and 121H through which external air flows may be arranged in a lower portion of the body 10, and the air outlet 111H that discharges the air flown into the inside of the body 10 through the air inlets 112H and 121H may be arranged in an upper portion of the body 10.

As shown in FIGS. 1 and 2, the body 10 may have a schematically spherical shape. In this case, the air inlets 112H and 121H and the air outlet 111H may be formed in a grill shape having a plurality of slits provided in the body 10.

The body 10 may effectively inhale air outside the body 10 into the inside of the body 10 through the air inlets 112H and 121H, and effectively disperse and discharge the purified air into the outside of the body 10 through the air outlet 111H.

However, the body 10 may be formed in various shapes such as a hexahedral shape or a cylindrical shape in addition to the spherical shape, and the shapes of the air inlets 112H and 121H and the air outlet 111H may vary.

A display 30 may be disposed at the upper end of the body 10.

The display 30 may visually display an operation state of the air purifier 1, and may be combined with the body 10 to form a spherical shape as a whole.

The display 30 may include a touch panel or an operation button, and receive an operation command of the air purifier 1 through a touch input of a user or a pressing of the operation button.

Figure 4:
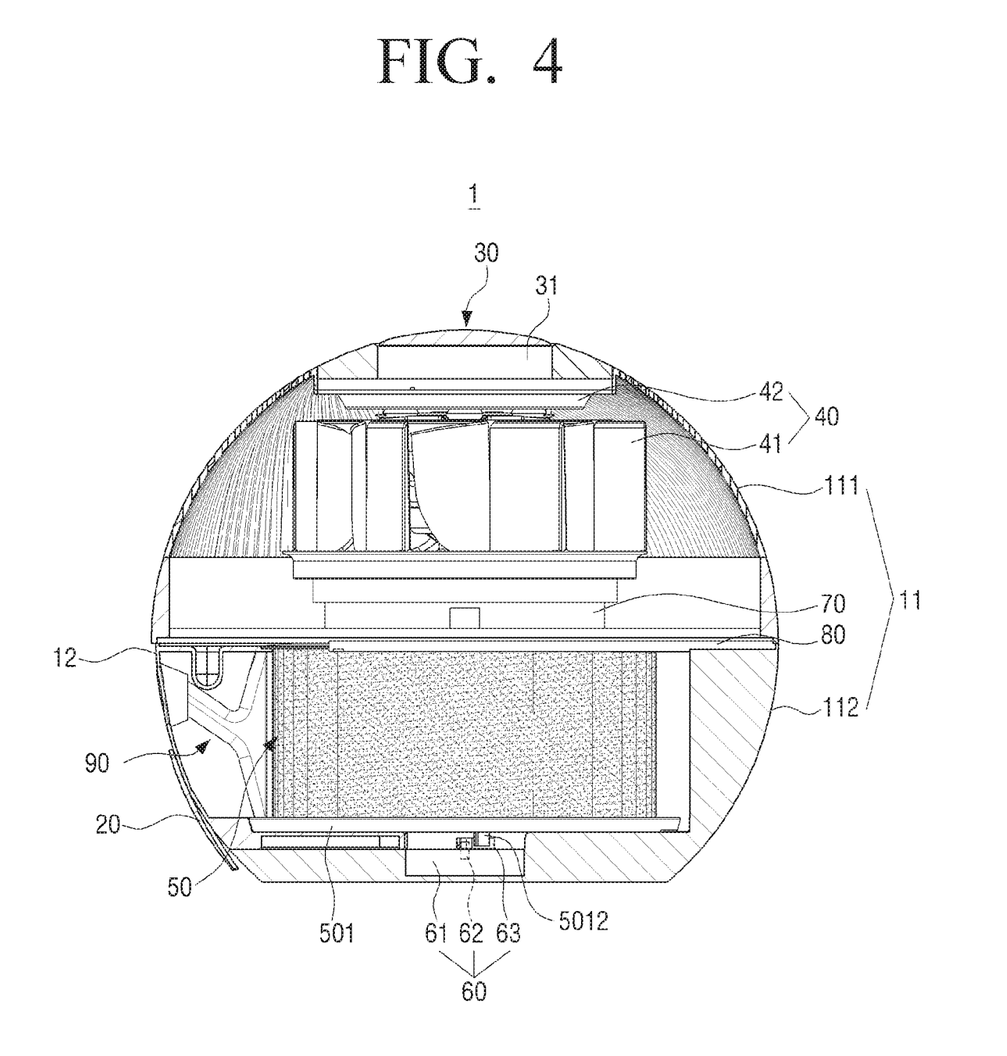
FIG. 4 is a front view illustrating an inside of the air purifier shown in FIG. 2.

The air purifier 1 may include a controller 31 (see FIG. 4) that receives an operation command of the display 30 and controls an air blowing unit 40 (see FIG. 4). The air purifier 1 may include a speaker (not shown) that displays an operation state of the air purifier 1 by sound. In this case, the speaker may be controlled by the controller 31.

As shown in FIGS. 1 and 2, the body 10 may include an insertion hole 122 provided on one side of the body 10, and the cover 20 that opens and closes the insertion hole 122 may be combined with the body 10.

The insertion hole 122 may be detachably connected to a vacuum cleaner, for example, a vacuum cleaner extension pipe P (see FIG. 6) may be detachably coupled. Thus, the cleaning of the filter unit 50 (see FIG. 3) may be performed by expanding a suction force of the vacuum cleaner to the inside of a cleaning member 90 (see FIG. 4) described below.

However, a vacuum cleaner inhalation unit to which a suction force generated by a body of the vacuum cleaner such as an extension hose, a handle, etc. in addition to the vacuum cleaner extension pipe (P) is transmitted may be detachably connected to the insertion hole 122.

The cover 20 may be slidably coupled to the body 10 so as to open and close the insertion hole 122. The cover 20 may also be pivotally coupled to the body 10 without being slidably coupled to the body 10, and may be removably coupled to the body 10.

Figure 3:
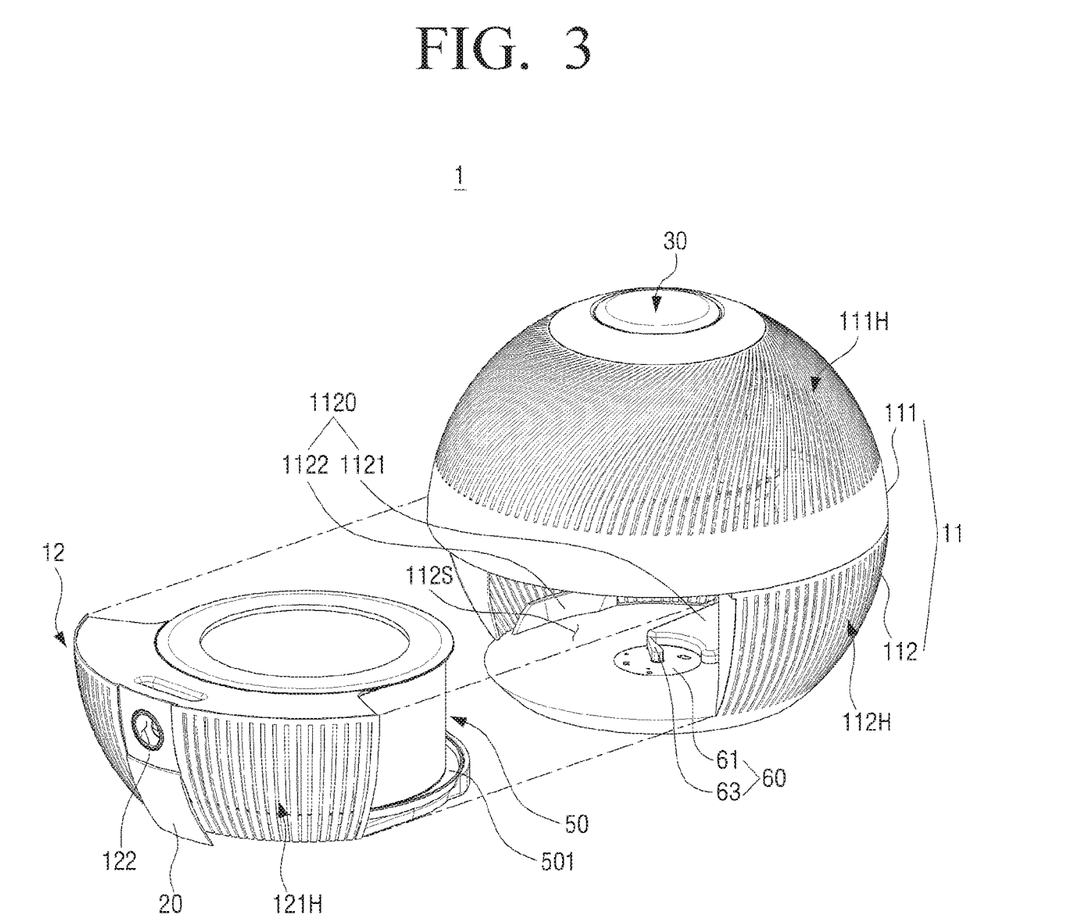
FIG. 3 is an exploded perspective view illustrating a state where a filter basket of the air purifier shown in FIG. 2 is separated from a body.

FIG. 3 is an exploded perspective view illustrating a state where a filter basket 12 of the air purifier 1 shown in FIG. 2 is separated from a body 10.

The body 10 as shown in FIG. 3 may include a main case 11 and a filter basket 12 detachably engaged with the main case 11.

The main case 11 may include an upper case 111 and a lower case 112. However, the upper case 111 may be integrated with the lower case 112.

The filter basket 12 may be coupled to the main case 11 to form a part of the outer appearance of the air purifier 1. The filter basket 12 may be separated by being inserted into the lower case 112 or pulled out from the lower case 112.

The lower case 112 may include an engagement unit 1125 which is opened to one side so that the filter basket 12 may be engaged.

The insertion hole 122 may be formed on one side of the filter basket 12, and the cover 20 that opens and closes the insertion hole 122 may be engaged with the filter basket 12.

The upper case 111 may have a schematically hemispherical shape, and the lower case 112 to which the filter basket 12 is coupled may also have a schematically hemispherical shape.

As shown in FIG. 3, the lower case 112 and the filter basket 12 may include the air inlets 112H and 121H into which outside air is flown, and the air inlet 112H of the lower case 112 and the air inlet 121H of the filter basket 12 each may be provided in a grill shape that forms the outer appearance of the lower case 112 and the filter basket 12.

The upper case 111 may include the air outlet 111H that emits air flown into the inside of the body 10 through the air inlets 112H and 121H, and the air outlet 111H of the upper case 111 may be provided in a grill shape forming the outer appearance of the upper case 111.

However, the shapes of the air outlet 111H and the air inlets 112H and 121H may vary to have a plurality of circular holes or a predetermined pattern.

As shown in FIG. 3, a filter unit 50 may be arranged inside the filter basket 12.

The filter unit 50 may be disposed inside the filter basket 12, particularly provided on a filter tray 501 arranged to be rotatable inside the filter basket 12. The filter unit 50 may be engaged with the main case 11 together with the filter basket 12, or detached from the main case 11.

Therefore, it is required to change the filter unit 50, the filter unit 50 may be easily changed by detaching the filter unit 50 disposed on the filter tray 501 after pulling out the filter basket 12 from the lower case 112.

As described above, the filter basket 12 may be engaged with the main case 11 by being inserted into the engagement unit 1125 of the lower case 112.

The lower case 112 may include a plurality of guide members 1120 for guiding the engagement of the filter basket 12.

The guide member 1120 may be a protrusion corresponding to the shape of the filter basket 12 inserted into the engagement unit 1125, and could protrude from a bottom surface of the filter basket 12. The guide member 1120 may include a first guide protrusion 1121 formed at the center of the bottom surface of the filter basket 12 and a second guide protrusion 1122 formed on both sides of the bottom surface of the filter basket 12.

The filter basket 12 may include a guide groove 1230 (see FIG. 5) corresponding to the shape of the guide member 1120.

The guide groove 1230 may include a first guide groove 1231 (see FIG. 5) corresponding to the first guide protrusion 1121 and a second guide groove 1232 (see FIG. 5) corresponding to the second guide protrusion 1122.

The filter basket 12 may be guided by the guide member 1120 while being inserted into the engaging unit 1125, and accurately engaged with the main case 11 through the guide member 1120.

A driving motor 60 for rotating the filter tray 501 to which the filter unit 50 is coupled may be arranged on the bottom surface of the upper case 112.

The driving motor 60 may include a motor main body 61 including a motor shaft 62 and a pressing member 63 rotating in engagement with the motor shaft 62 and extending in a direction perpendicular to the motor shaft 62.

When the pressing member 63 rotates in a state where the filter basket 12 on which the filter unit 50 is disposed is coupled to the main case 11, an engagement member 5012 (see FIG. 4) of the filter tray 501 may be pressed by the pressing member 63 so that the filter unit 50 may rotate.

The filter unit 50 may include a cylinder-shape filter 51, a ring-shaped cover 52 engaged with an upper surface 511 of the filter 51 (see FIG. 7) of the filter 51, and a lower cover 53 (see FIG. 5) coupled to a lower surface 512 (see FIG. 7) of the filter 51.

The filter unit 50 may be disposed on the filter tray 501 which is arranged to be rotatable in the filter basket 12 and may rotate together with the filter tray 501. The detailed structure of the filter unit 50 will be described below.

Figure 5:
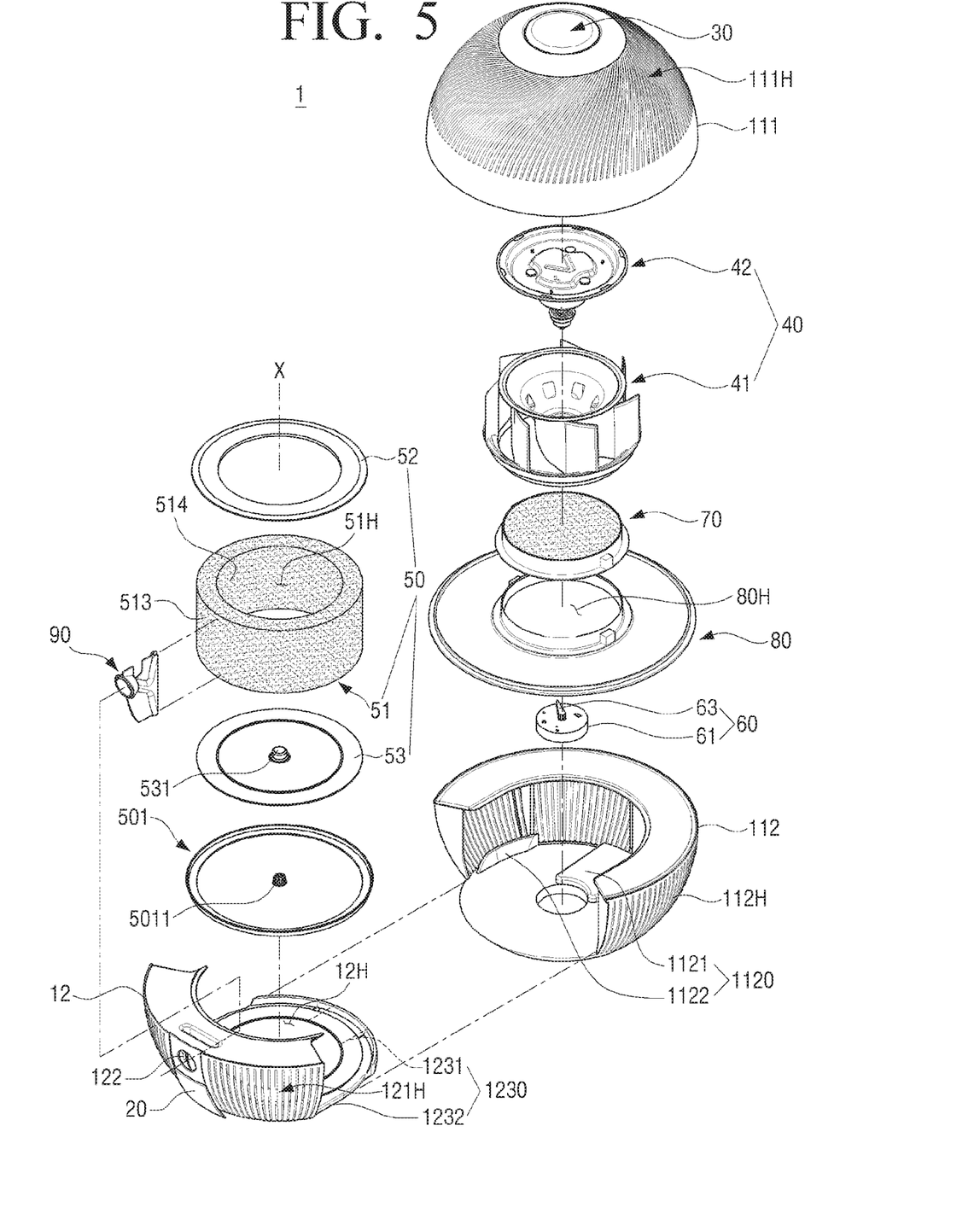
FIG. 5 is an exploded perspective view illustrating the air purifier shown in FIG. 2.

FIG. 4 is a front view illustrating an inside of the air purifier 1 shown in FIG. 2, and FIG. 5 is an exploded perspective view illustrating the air purifier 1 shown in FIG. 2.

Referring to FIGS. 3 to 5, the detailed description of the structure of the air purifier 1 will be made below.

The air purifier 1 may include a body 10 forming the outer appearance of the air purifier, a cover 20 for opening and closing the insertion hole 122, a display 30, an air blowing unit 40 arranged inside the body 10, a filter unit 50 arranged between the air blowing unit 40 and the air inlets 112H and 121H, a filter tray 501 on which the filter unit 50 is disposed, a driving motor 60 for rotating the filter tray 510, an auxiliary filter 70 arranged between the filter unit 50 and the air blowing unit 40, a blocking member 80 disposed between the upper case 111 and the lower case 112, and a cleaning member 90.

As described above, the body 10 forming the outer appearance of the air purifier 1 may include the upper case 111, the lower case 112 and the filter basket 12 detachably coupled to the lower case 112.

The blocking member 80 may be arranged between the upper case 111 and the lower case 112.

The blocking member 80 may be a circular shape plate including a penetration hole 80H at the center, and may close a space between the upper case 111 and the lower case 112 which is coupled to the filter basket 12.

The air flown into the inside of the lower case 112, which is engaged with the filter basket 12, through the air inlets 112H and 121H may be moved to the inside of the upper case 111 by passing through the penetration hole 80H of the blocking member 80.

As described above, the filter basket 12 may be detachably coupled to the lower case 112, and the filter tray 501 may be disposed inside the filter basket 12.

The filter unit 50 may include a cylindrical filter 51 which is rotatable based on a rotation axis X, a ring-shaped cover 52 engaged with the upper surface 511 of the filter 51, and a lower cover 53 engaged with the lower surface 512 of the filter 51.

The filter 51 may have a cylinder shape, and may include a penetration hole 51H passing through the inside of the filter 51, and the ring-shaped cover 52 engaged with the upper surface 511 of the filter 51 may include a hole corresponding to the penetration hole 51H of the filter 51.

The lower cover 53 may cover one side of the penetration hole 51H in engagement with the lower surface 512 of the filter 51.

The filter tray 501 may include an engagement protrusion 5011 that protrudes upward toward the lower cover 53, and the lower cover 53 may include an engagement groove 531 upwardly projected corresponding to the engagement protrusion 5011.

The filter 51 may be engaged with the filter tray 501 when the engagement protrusion 5011 of the filter tray 510 is inserted into the engagement unit 531 of the lower cover 53.

When the filter tray 501 rotates, the filter unit 50 disposed on the filter tray 510 may rotate. The filter unit 50 may be easily changed since it is detachably engaged with the insertion protrusion 5011 of the filter tray 501.

The filter 51, the ring-shaped cover 52 and the lower cover 53 may be integrally formed. The filter unit 50 and the filter tray 501 may be integrated. The filter 51, the ring-shaped cover 52, the lower cover 53 and the filter tray 510 may be integrated.

In addition, the filter 51 may be formed by a fine porous material so that air can pass through the filter 51.

The air that has flown into the inside of the body 10 through the air inlets 112H and 121H may be flown into an outer circumferential surface 513 of the filter 51, may pass through the inside of the filter 51, and may be discharged from an inner circumferential surface 514 of the filter 51 into the penetration hole 51H of the filter 51. During this process, contaminants may be removed.

The filter 51 may include a pre-filter for filtering dust or pollen, and a dust filter for filtering fine dust or the like. In addition, the filter 51 may have a structure in which a pre-filter disposed on an outer side of the filter 51 with respect to the rotation axis X and a dust filter disposed on an inner side of the filter 51 are stacked.

For example, the air flown into the body 10 through the air inlets 112H and 121H may primarily pass through the pre-filter disposed on the outer side of the filter 51, pass through the dust filter disposed on the inner side of the filter 51, sequentially pass the penetration hole 51H of the filter 51 and the penetration hole 80H of the blocking member 80, and move to the upper case 111.

However, the filter 51 may further include various filters in addition to the above-described pre-filter and dust filter, or may be a complex filter, which is a combined filter with multiple filters. Hereinafter, for convenience of explanation, a complex filter having a structure in which a pre-filter and a dust filter are combined will be collectively referred to as the filter 51.

It is desirable that the air inlets 112H and 121H are arranged to surround the outer circumferential surface 513 of the filter 51 so that the air flown into the air inlets 112H and 121H may be easily flown into the outer circumferential surface 513 of the filter 51.

The air inlet 121H of the filter basket 12 and the air inlet 112H of the lower case 112 may be provided in a grill shape so that the filter basket 12 may surround the outer circumferential surface 513 of the filter 51 while being engaged with the lower case 112.

The outside air around the body 10 may be flown into the body 10 through the air inlets 112H and 121H in the 360° direction of the body 10, the air flown into the inside of the body 10 may be easily flown into the entire area of the outer peripheral surface 513 of the filter 51 and may pass through the filter 51, so that the contaminants can be effectively removed.

As described above, the driving motor 60 that rotates the filter tray 501 to which the filter unit 50 is coupled may be arranged on a bottom surface of the lower case 112, and the driving motor 60 may include the motor main body 61 and the pressing member 63 which rotates in engagement with the motor shaft 62 and extends in a direction perpendicular to the motor shaft 62.

The filter basket 12 may include the penetration hole 12H formed on the bottom surface where the filter tray 501 is disposed, and the penetration hole 12H of the filter basket 12 may have a smaller diameter than the filter tray 501. The filter tray 501 may be disposed on the bottom surface of the filter basket 12.

The filter tray 501 may include an engagement member 5012 disposed on the lower surface of the filter tray 501 so as to be eccentric from the rotation axis X of the filter unit 50.

The engaging member 5012 may protrude downward from the lower surface of the filter tray 501 and may be arranged inside the penetration hole 12H of the filter basket 12 when the filter tray 501 is disposed in the filter basket 12.

While the filter basket 12 is engaged with the lower case 112, the pressing member 63 of the driving motor 60 may also be disposed inside the penetration hole 12H of the filter basket 12. As a result, the pressing member 63 may be positioned on the same plane as the engagement member 5012.

When the drive motor 60 is operated in a state where the filter basket 12 on which the filter tray 501 is disposed is engaged with the lower case 112, the pressing member 63 may rotate together with the motor shaft 62 based on the motor shaft 62.

As the engagement member 5012 of the filter tray 501 is pressed to one side by the rotating pressing member 63, the filter tray 501 may rotate based on the rotation axis X.

Therefore, the filter 51 engaged with the filter tray 501 may rotate based on the rotation axis X, and the filter unit 50 may rotate based on the rotation axis X.

It is desirable that the motor shaft 62 and the rotation axis X of the filter unit 50 are coaxially disposed.

The engagement member 5012 disposed on the lower surface of the filter tray 501 may be disposed eccentrically from the rotation axis X and the pressing member 63 may extend in a direction perpendicular to the motor shaft 62 arranged on the same line as the rotation axis X of the filter unit 50. Therefore, the filter unit 50 may rotate based on the rotation axis X without any separate coupling structure between the filter unit 50 and the driving motor 60 since the rotating pressing member 63 presses the engagement member 5012.

In addition, in the process of detaching and reattaching the filter basket 12 on which the filter unit 50 is placed from the lower case 112, the pressing member 63 may be arranged inside the penetration hole 12H of the filter basket 12 to rotate the filter unit 50, and thus the driving motor 60 may rotate the filter unit 50 with a simple structure without a separate combination structure with the filter unit 50.

The vacuum cleaner extension pipe P may be detachably coupled to the inside of the filter basket 12 by being connected to the insertion hole 122 and disposed in proximity to the filter unit 50 so that the cleaning member 90 for discharging the contaminants adhering to the filter unit 50 into the vacuum cleaner through the suction force of the vacuum cleaner may be arranged.

The description on how the cleaning of the filter unit 50 is performed through the cleaning member 90 will be made below.

The air blowing unit 40 which forcibly introduce outside air into the inside of the body 10 through the air inlets 112H and 121H and discharges the air into the air outlet 111H may be arranged inside the upper case 111.

The air blowing unit 40 may include a blowing pan 41 and a pan motor 42 for rotating the air blowing pan 41.

The air blowing fan 41 may consist of a sirocco fan, a centrifugal fan, or the like. The air blowing fan 41 may be a typical air inlet fan that inhales outside air to one side and then discharges the air into the other side.

The outside air may be flown into the inside of the lower case 112 to which the filter basket 12 is coupled through the air inlets 112H and 121H when the air blowing pan 41 rotates by the pan motor 42, and the air flown into the lower case 112 and the filter basket 12 may pass through the filter 51 so that contaminants may be removed.

The purified air may pass through the penetration hole 51H of the filter 51, pass through the penetration hole 80H of the blocking member 80, move to the inside of the upper case 111, pass through the air blowing pan 41, and be discharged into the outside of the upper case 111 through the air outlet 111H.

The auxiliary filter 70 may be engaged with the penetration hole 80H of the blocking member 80.

The auxiliary filter 70 may be fixedly arranged inside the penetration hole 80H of the blocking member 80 unlike the filter 51 which is rotatable based on the rotation axis X, and may additionally filter contaminants present in the air purified by the filter 51.

The auxiliary filter 70 may include at least one of an antibacterial filter for sterilization, a deodorization filter for deodorization, and a photocatalytic filter, and may include various kinds of filters.

The air flown through the air inlets 112H and 121H may be primarily filtered through a pre-filter arranged outside the filter 51, so that contaminants such as dust may be attached to the outer circumferential surface 53 of the filter 51. The contaminants may be attached on the ring-shaped cover 52 and the filter tray 501.

When the contaminants accumulate on the surface of the filter unit 50, a user may combine the vacuum cleaner extension pipe P with the cleaning member 90 through the insertion hole 122, remove the contaminants adhering to the filter unit 50 through the suction force of the vacuum cleaner, and discharge the contaminants into the vacuum cleaner.

In the process of removing the contaminants adhering to the filter unit 50 through the suction force of the vacuum cleaner, the driving motor 60 may operate and the filter unit 50 may rotate, so that the contaminants adhering to the entire area of the filter unit 50 may be effectively removed.

Figure 6:
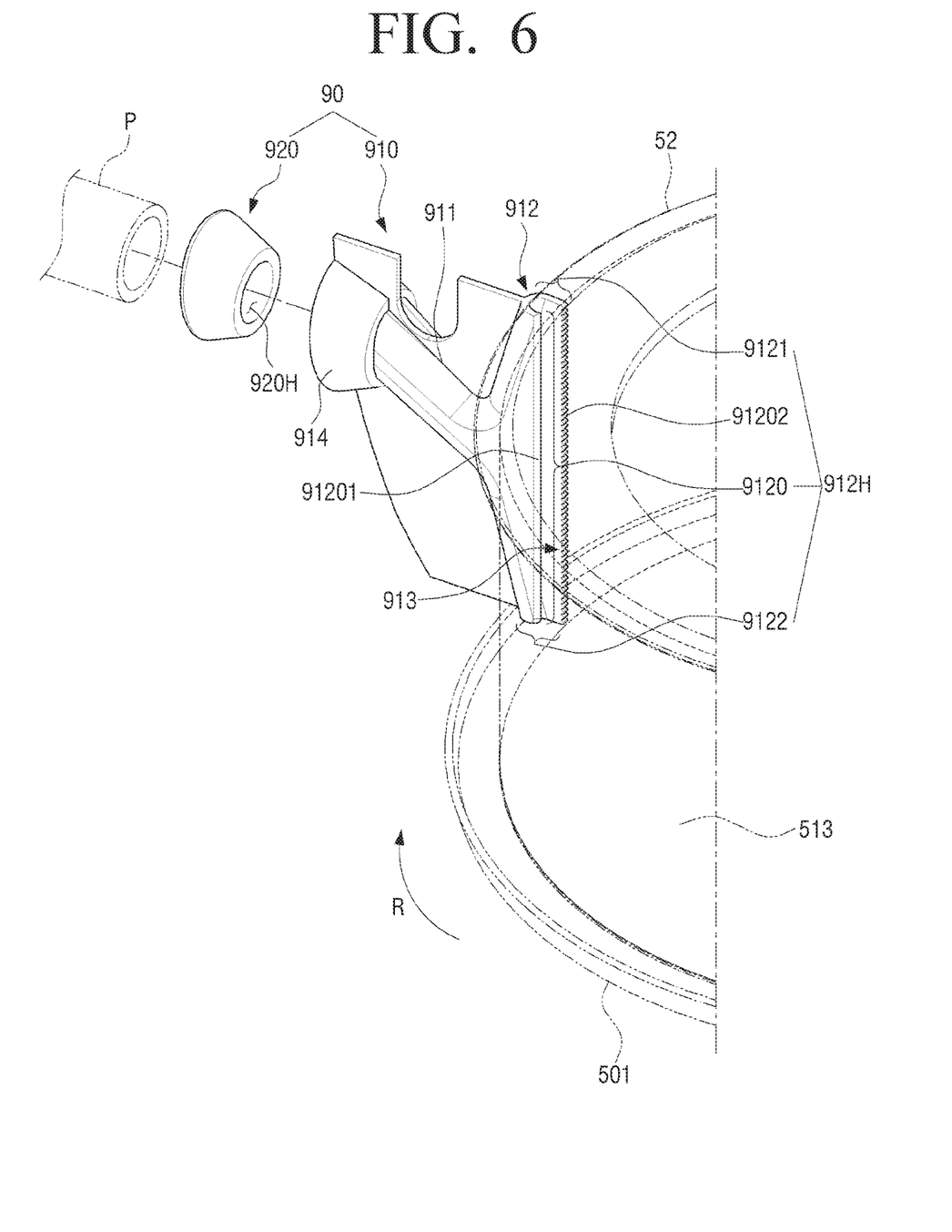
FIG. 6 is an enlarged perspective view illustrating an inside of the air purifier shown in FIG. 4 where a cleaning member is disposed.
Figure 7:
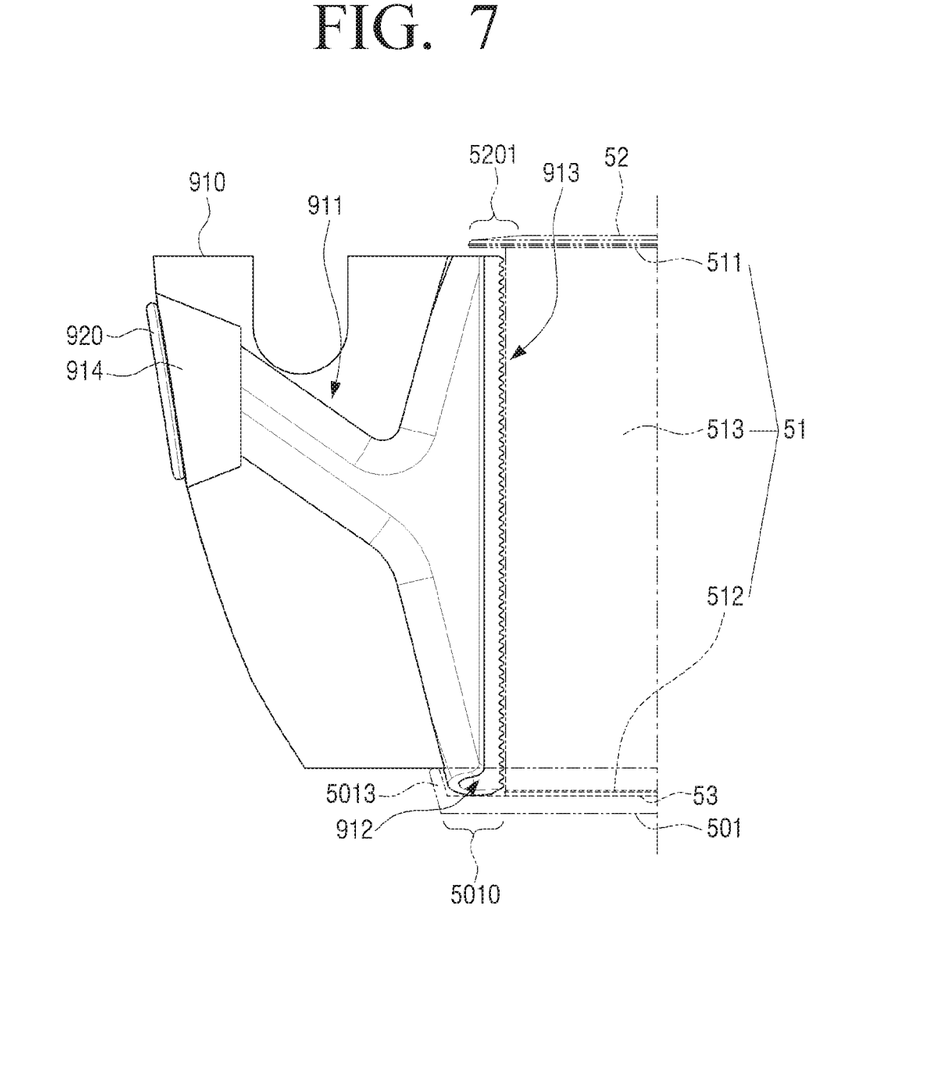
FIG. 7 is a front view of FIG. 6.
Figure 8:
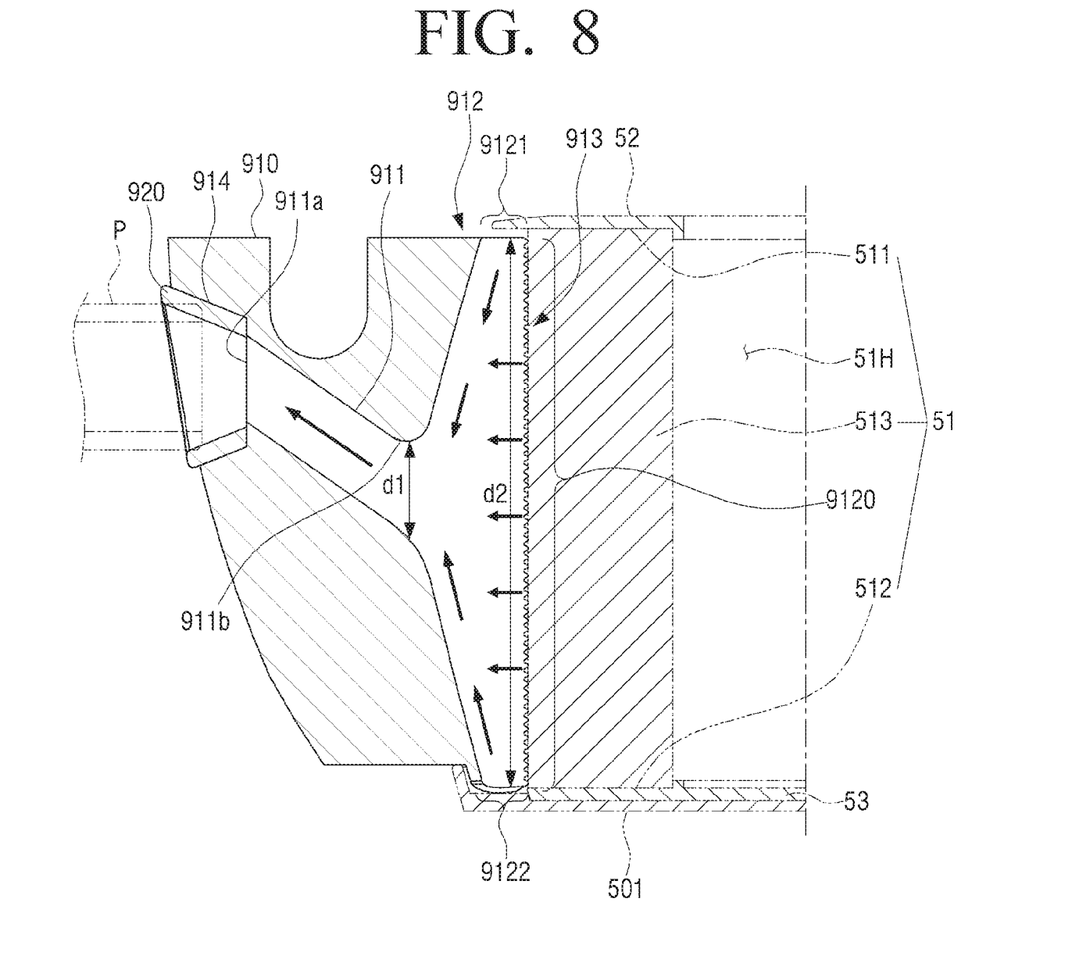
FIG. 8 is a cross-sectional view illustrating an inside of the air purifier shown in FIG. 7.

FIG. 6 is an enlarged perspective view illustrating an inside of the air purifier 1 shown in FIG. 4 where a cleaning member 90 is disposed, FIG. 7 is a front view of FIG. 6, and FIG. 8 is a cross-sectional view illustrating an inside of the air purifier shown in FIG. 7. FIG. 8 further illustrates a vacuum cleaner extension pipe P engaged with the cleaning member 90.

Hereinafter, referring to FIGS. 6 to 8, the description on how the contaminants of the filter unit 50 are removed by the cleaning member 90 will be made.

The cleaning member 90 may be coupled to the inside of the filter basket 12 and arranged in proximity to the filter unit 50, and connected to the insertion hole 122 of the filter basket 12.

Specifically, the cleaning member 90 may include a body 910 including a suction flow path 911 where the vacuum cleaner extension pipe P is inserted into one side 911A, and a suction port 912 including an air inlet port 912H connected to other side 911B of the suction flow path 911 and opened along a longitudinal direction (a height direction) of the filter unit 50.

The vacuum cleaner extension pipe P may be detachably connected to the one side 911A of the suction flow path 911.

When the vacuum cleaner is operated in a state where the vacuum cleaner extension pipe P is connected to one side 911A of the suction flow path 911, the contaminants adhering to the surface of the filter unit 50 may be suctioned into the vacuum cleaner through the suction port 912 connected to the other side of the suction flow path 911.

The suction port 912 may be elongated along a longitudinal direction (a height of the filter 51) of the outer circumferential surface 513 of the filter 51, and disposed in parallel with the rotation axis X of the filter unit 50 to face the outer circumferential surface 513 of the filter 51.

The air inlet port 912H of the suction port 912 may be opened to face the outer circumferential surface 513 of the filter 51, and thus the suction port 912 may effectively inhale the contaminants adhering to the outer circumferential surface 513 of the filter 51 through the air inlet port 912H.

The air inlet port 912H of the suction port 912 may face the entire area of the outer circumferential surface 513 of the filter 51 when the filter unit 50 rotates based on the rotation axis X, and inhale the contaminants accumulated on the entire area of the outer circumferential surface 513 of the filter 51 through the suction force of the vacuum cleaner.

The outer diameter of the ring-shaped cover 52 and the outer diameter of the filter tray 501 each may have a greater diameter than the outer circumferential surface 513 of the filter 51.

The ring-shaped cover 52 and the filter tray 501 may protrude in a direction perpendicular to the rotation axis X than the outer circumferential surface 513 of the filter 51.

The filter tray 501 of the ring-shaped cover 52 may firmly support the rotating filter 51.

The suction port 912 may be disposed between the ring-shaped cover 52 and the filter tray 501 and face the outer circumferential surface 513 of the filter 51.

Referring to FIG. 7, the suction port 912 may be disposed between the protrusion 5201 of the ring-shaped cover 52 and the protrusion 5010 of the filter tray 501 and face the outer circumferential surface 513 of the filter 51.

The suction port 912 may effectively remove the contaminants adhering to the outer circumferential surface 513 of the filter 51.

The suction port 912 may be disposed between the protrusion 5201 of the ring-shaped cover 52 and the protrusion 5010 of the filter tray 501 so that the protrusion 5201 of the ring-shaped cover 52 and the protrusion 5010 of the filter tray 501 may prevent the contaminants from being scattered into the body 10 while the suction port 912 inhales the contaminants.

Referring to FIG. 6, the air inlet port 912H of the suction port 912 may include a main air inlet port 9120 which is opened toward the outer circumferential surface 513 of the filter 51, and first and second auxiliary air inlet ports 9121 and 9122 which are respectively arranged on both sides of the main air inlet port 9120 and opened toward the protrusion 5201 of the ring-shaped cover 52 and the protrusion 5010 of the filter tray 501.

The main air inlet port 9120, the first auxiliary air inlet port 9121 and the second auxiliary air inlet port 9122 may be integrally provided to form the air inlet port 912H of the suction port 912 which is opened along a longitudinal direction of the filter unit 50.

The main air inlet port 9120 may be arranged in proximity to the outer circumferential surface 513 of the filter 51 to face the outer circumferential surface 513 of the filter 51, and effectively inhale the contaminants adhering to the outer circumferential surface 513 of the filter 51.

The first auxiliary air inlet port 9121 may be arranged in proximity to the protrusion 5201 of the ring-shaped cover 52, and may inhale the contaminants adhering to the protrusion 5201 of the ring-shaped cover 52.

While the air purifier 1 is operated, the contaminants accumulated on the filter unit 50 may be dropped onto the protrusion 5010 of the filter tray 501 by gravity, and a large amount of pollutants may be accumulated on the protrusion 5010 of the filter tray 501.

The second auxiliary air inlet port 9122 may be arranged in proximity to the upper side of the protrusion 5010 of the filter tray 501 and opened toward the protrusion 5010 of the filter tray 501 to effectively inhale the contaminants accumulated on the protrusion 5010 of the filter tray 501.

The filter tray 501 may include a wall 5013 protruding upward from the outer diameter.

The second auxiliary air inlet port 9122 may be arranged between the wall 5013 of the filter tray 501 and the outer circumferential surface 513 of the filter 51 to increase the suction force applied to the protrusion 5010 of the filter tray 501 from the second auxiliary air inlet port 9122. The second auxiliary air inlet port 9122 may effectively inhale the contaminants accumulated onto the protrusion 5010 of the filter tray 501.

Referring to FIG. 8, the diameter of the air inlet port 912H of the suction port 912 may increase from one end adjacent to the suction flow path 911 toward the other end adjacent to the filter unit 50. As shown in FIG. 8, the suction force applied to the inside of the cleaning member 90 through the vacuum cleaner extension pipe P is indicated by an arrow.

For example, a diameter d1 on one end of the air inlet port 912H adjacent to the suction flow path 911 may be the same as a diameter of the suction flow path 911, and a diameter d2 on the other side of the air inlet port 912H adjacent to the filter unit 50 may be greater than the diameter d1 on one side of the air inlet port 912H.

The suction force of the vacuum cleaner may be effectively applied to the filter unit 50 through the air inlet port 912H by passing through the suction flow path 911.

The cleaning member 90 may be arranged along a periphery of the main air inlet port 9120 and may include a rake part 913 which rakes the contaminants adhering to the outer circumferential surface 513 of the filter 51.

Referring to FIGS. 6 to 8, the rake part 913 may include a plurality of protrusions that protrude toward the outer circumferential surface 513 of the filter 51 and the rake part 913 including a plurality of protrusions may be arranged to be adjacent to the outer circumferential surface 513 of the filter 51 and remove the contaminants adhering to the outer circumferential surface 513 of the filter 51 that rotates based on the rotation axis X.

The rake part 913 may include not only a plurality of protrusions but also a plurality of brushes.

The rake part 913 may be arranged in proximity to the outer circumferential surface 513 of the filter 51 to rake the contaminants adhering to the outer circumferential surface 513 of the filter 51, but spaced apart from thereof not to face the outer circumferential surface 513 of the filter 51, thereby preventing damage to the filter 51.

Referring to FIG. 6, the main air inlet port 9120 may include first and second edges 91201 and 91202 arranged in parallel with each other along a longitudinal direction of the outer circumferential surface 513 of the filter 51.

The first edge 91201, the main air inlet port 9120 and the second edge 91202 may be sequentially arranged according to a rotational direction R of a filter, and the rake part 913 including a plurality of protrusions or a plurality of brushes may be arranged on the second edge 91202.

The second edge 91202 on which the rake part 913 is arranged may protrude to be arranged in proximity to the outer circumferential surface 513 of the filter than the first edge 91201, and the rake part 913 may rake the contaminants adhering to the outer circumferential surface 513 of the filter 51 since the filter 51 rotates along the rotational direction R.

Referring to FIG. 6, the rotational direction R of the filter unit 50 may be set to clockwise on the basis of the filter unit 50 when viewed from the above.

Therefore, when the filter unit 50 rotates in the rotational direction R, the contaminants adhering to the outer circumferential surface 513 of the filter 51 may be removed by the rake part 913 arranged on the second edge 91202. To be specific, the contaminants adhering to the outer circumferential surface 513 of the filter 51 may be removed on one side of the rake part 913 in proximity to the main air inlet port 9120, and therefore the contaminants may be easily flown into the main air inlet port 9120.

The body 910 may further include a docking unit 914 connected to the one side 911A of the suction flow path 911, and the vacuum cleaner extension pipe P may be inserted into and engaged with the docking unit 914.

The cover 20 may open and close the insertion hole 122 and the docking unit 914.

The cleaning member 90 may further include a packing member 920 that surrounds an inner circumferential surface of the docking unit 914.

The packing member 920 may be made of rubber or synthetic resin having elasticity.

The packing member 920 may cover the vacuum cleaner extension pipe P inserted into the penetration hole 920H of the packing member 920 in an air-tight state, and the suction force of the vacuum cleaner extension pipe P may be applied to the suction flow path 911 without damage.

The suction flow path 911, the suction port 912, the rake part 913 and the docking unit 914 may be a part of the body 910, and may be formed when the body 910 is embodied.

However, the suction flow path 911, the suction port 912, the rake part 913 and the docking unit 914 may not be integrally formed in the body 910, but separately engaged with the body 910 as an individual constituent element.

Hereinafter, the operation process of the air purifier 1 according to an embodiment of the present disclosure in an air purifying mode and the operation process in a filter cleaning mode will be described in in detail.

When the air purifier 1 operates in an air purifying mode, a controller 31 may operate the air blowing unit 40, and the air blowing pan 41 may rotate through the pan motor 42, thereby inhaling outside air into the inside of the body 10 through the air inlets 112H and 121H.

The air flown through the air inlets 112H and 121H may pass through the filter 51 so that the contaminants may be filtered.

When the air purifier 1 operates in an air purifying mode, the controller 31 may control the driving motor 60 not to operate, and therefore, the position of the filter unit 50 may be fixed without rotating.

The air passing through the filter 51 may pass through the penetration hole 51H of the filter 51 and the auxiliary filter 70 arranged in the penetration hole 80H of the blocking member 80, so that bacteria, viruses, fungi, chemicals or the like may be further removed.

The air that has been cleaned by passing through the auxiliary filter 70 may be discharged to the outside through the air outlet 111H by passing through the air blowing fan 41 disposed inside the upper case 111.

The air purifier 1 may operate in a filter cleaning mode to remove the contaminants adhering to the filter unit 50.

The air purifier 1 may operate in a filter cleaning mode when a user operates a touch panel or an operation button of the display 30.

The controller 31 may measure the time when the air purifier 1 operates in an air purifying mode, and when the air purifier 1 operates in an air purifying mode for a predetermined time or longer, the controller 31 may guide a user to process a filer cleaning mode through the display 30.

A user may open the cover 20 and insert the vacuum cleaner extension pipe P into the insertion hole 122 of the body 10, connect the vacuum cleaner extension pipe P to the cleaning member 90, operate the vacuum cleaner, and change a mode of the air purifier 1 to a filter cleaning mode.

When the filter cleaning mode is started, the controller 31 may control the driving motor 60 so that the pressing member 63 of the driving motor 60 may rotate.

When the air purifier 1 operates in a filter cleaning mode, the controller 31 may control the air blowing unit 40 not to operate, thereby prevent outside air from being flown into the inside of the body 10 through the air inlets 112H and 121H.

The engagement member 5012 may rotate by the rotating pressing member 63, and as the filter tray 501 rotates, the filter unit 50 disposed inside the filter tray 501 may rotate based on the rotation axis X.

The main air inlet port 9120 of the suction port 912 may inhale the contaminants adhering to the outer circumferential surface 513 of the rotating filter 51.

The first auxiliary air inlet port 9121 and the second auxiliary air inlet port 9122 may further inhale the contaminants on the protrusion 5201 of the filter 52 and the protrusion 5010 of the filter tray 501.

The rake part 913 arranged on the second edge 91202 may rake the contaminants adhering to the outer circumferential surface 513 of the rotating filter 51, easily remove the contaminants adhering to the outer circumferential surface 513 of the filter 51, and the removed contaminants may be flown through the air inlet port 912H.

The contaminants flown through the air inlet port 912H of the suction port 912 may be flown into the vacuum cleaner extension pipe P by passing through the suction flow path 911, and discharged into the vacuum cleaner.

The air purifier 1 may operate in a filter cleaning mode by detecting whether the cover 20 is opened or closed through an additional sensor (not shown) that senses whether the cover 20 is opened or closed.

For example, the controller 31 may stop the operation of the air blowing unit 40 when sensing that the cover 20 is opened through the sensor, and control the driving motor 60 so that the pressing member 63 of the driving motor 60 may rotate.

A user may insert the vacuum cleaner extension pipe P to the insertion hole 122 of the body 10, connect the vacuum cleaner extension pipe P to the cleaning member 90, and operate the vacuum cleaner, thereby removing the contaminants of the filter unit 50 and the filter tray 501.

In addition, an additional sensor (not shown) that senses the insertion of the vacuum cleaner extension pipe P may be arranged in the insertion hole 122 of the body 10 or on the inner circumferential surface of the docking unit 914.

The sensor that senses the insertion of the vacuum cleaner extension pipe P may protrude toward the inner circumferential surface of the insertion hole 122 or the inner circumferential surface of the docking unit 914 and include a pressing sensor that can be pressed by the vacuum cleaner extension pipe P or a lever sensor.

Therefore, when the vacuum cleaner extension pipe P is inserted into the insertion hole 122 of the body 10, the controller 31 may sense the insertion of the vacuum cleaner extension pipe P through the sensor, and operate the air purifier 1 in a filter cleaning mode. Therefore, the controller 31 may stop the operation of the air blowing unit 40 and the control the driving motor 60 to allow the pressing member 63 of the driving motor 60 to rotate.

A user may remove the contaminants of the filter unit 50 and the filter tray 501 by operating the vacuum cleaner.

The air purifier 1 may include a sensor that senses whether the cover 20 is opened or closed, or a sensor that senses the insertion of the vacuum cleaner extension pipe P, thereby automatically operating in a filter cleaning mode without additional user input.

The air purifier 1 according to an embodiment of the present disclosure may rotate the filter unit 50 in a filter cleaning mode, and introduce the contaminants adhering to the filter unit 50 to be flown into the vacuum cleaner through the air inlet port 912H of the suction port 912, thereby easily removing the contaminants adhering to the filter unit 50.

The cleaning member 90 may further include the rake part 913 that can rake the contaminants adhering to the outer circumferential surface 513 of the filter 51, thereby easily removing the contaminants adhering to the outer circumferential surface 513 of the filter 51.

While the present invention has been particularly shown and described with reference to exemplary embodiments thereof, it is to be understood that the invention is not limited to the disclosed exemplary embodiments. It is possible.

As described above, various embodiments of the present disclosure have been described individually, but it is to be understood that the embodiments are not necessarily embodied alone. The configuration and operation of each example embodiment could be embodied in combination with at least one other example embodiment.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. An air purifier, comprising:
   a body including an air inlet and an air outlet;
   an air blowing unit disposed in an inside of the body, the air blowing unit being configured to forcibly introduce outside air into the inside of the body through the air inlet and discharge air into the air outlet;
   a filter unit rotatably disposed between the air blowing unit and the air inlet, and comprising a cylindrical filter rotatable based on a rotation axis, and a ring-shaped cover engaged with an upper surface of the cylindrical filter;
   a driving motor configured to rotate the filter unit;
   a filter tray on which the filter unit is disposed; and
   a cleaning member detachably connected to a vacuum cleaner and disposed in proximity to the filter unit to guide contaminants adhering to the filter unit to be flown into the vacuum cleaner, and comprising a suction port including an air inlet port opened along a longitudinal direction of the filter unit,
   wherein the ring-shaped cover and the filter tray each have a larger diameter than an outer circumferential surface of the cylindrical filter to protrude from the outer circumferential surface of the cylindrical filter in a direction perpendicular to the rotation axis and the suction port is disposed between the ring-shaped cover and the filter tray in parallel with the rotation axis to face the outer circumferential surface of the cylindrical filter, and wherein the air inlet port comprises a main air inlet port opened toward the outer circumferential surface of the cylindrical filter; and first and second auxiliary air inlet ports respectively disposed on both ends of the main air inlet port and opened toward a protrusion unit of the ring-shaped cover and a protrusion unit of the filter tray.

2. The air purifier as claimed in claim 1, wherein the cleaning member comprises:

a body including a suction flow path where an extension pipe of the vacuum cleaner is inserted into a first side of the suction flow path; and the suction port connected to a second side of the suction flow path.

3. The air purifier as claimed in claim 2, wherein a diameter of the air inlet increases from a first end adjacent to the suction flow path to a second end adjacent to the filter unit.

4. The air purifier as claimed in claim 1, wherein the cleaning member comprises a rake part disposed along a periphery of the main air inlet port and configured to rake contaminants adhering to the outer circumferential surface of the cylindrical filter.

5. The air purifier as claimed in claim 4, wherein the rake part is formed by a plurality of protrusions or a plurality of brushes protruding toward the outer circumferential surface of the cylindrical filter.

6. The air purifier as claimed in claim 5, wherein the main air inlet port comprises first and second edges disposed in parallel along a longitudinal direction of the outer circumferential surface of the cylindrical filter, wherein the first edge, the main air inlet port and the second edge are sequentially disposed along a rotational direction of the cylindrical filter, and wherein the plurality of protrusions and the plurality of brushes are disposed on the second edge.

7. The air purifier as claimed in claim 2, wherein the body further comprises: a docking unit connected to one side of the suction flow path and into which the extension pipe is inserted, wherein the cleaning member further includes a packing member surrounding an inner circumferential surface of the docking unit.

8. The air purifier as claimed in claim 7, further comprising:

a cover configured to open and close the docking unit.

9. The air purifier as claimed in claim 1, wherein the air inlet is formed in a grill shape that surrounds the outer circumferential surface of the cylindrical filter.

10. The air purifier as claimed in claim 1, wherein the filter tray comprises an engagement member disposed on a bottom surface of the filter tray to be eccentric from the rotation axis, and wherein the driving motor comprises:

a motor body including a motor shaft, and a pressing member rotating in engagement with the motor shaft, extending in a direction perpendicular to the motor shaft and pressing the engagement member to allow the filter tray to rotate.

11. The air purifier as claimed in claim 1, wherein the body further comprises:

a main case; and a filter basket detachably engaged with the main case, and wherein the filter unit and the cleaning member are disposed in the filter basket.

12. The air purifier as claimed in claim 11, wherein the filter basket comprises a grill surrounding an outer circumferential surface of the filter unit.

* * * * *